United States Patent
Furuta et al.

(10) Patent No.: US 6,824,120 B2
(45) Date of Patent: Nov. 30, 2004

(54) FLOW AMOUNT CONTROL DEVICE

(75) Inventors: Katsunori Furuta, Nagoya (JP); Hiroyuki Nishimura, Kariya (JP); Masashi Suzuki, Obu (JP)

(73) Assignee: Denso Corporation, Kariya (JP)

( * ) Notice: Subject to any disclaimer, the term of this patent is extended or adjusted under 35 U.S.C. 154(b) by 213 days.

(21) Appl. No.: 10/287,694

(22) Filed: Nov. 5, 2002

(65) Prior Publication Data

US 2003/0089872 A1 May 15, 2003

(30) Foreign Application Priority Data

Nov. 9, 2001 (JP) ........................................ 2001-344296
Nov. 14, 2001 (JP) ........................................ 2001-348972

(51) Int. Cl.[7] ............................................. F02M 59/20
(52) U.S. Cl. ............. 251/355; 251/129.01; 251/129.15; 251/309; 251/344
(58) Field of Search ....................... 251/129.01, 129.15, 251/309–311, 343–345, 355

(56) References Cited

U.S. PATENT DOCUMENTS 3,763,885 A * 10/1973 Sussman .................. 137/556.6
4,611,626 A * 9/1986 Logsdon ..................... 137/594
4,690,171 A * 9/1987 Johnston ..................... 137/877
4,880,411 A * 11/1989 Fangrow et al. ............ 604/149
5,788,213 A * 8/1998 Kanda et al. ........... 251/129.15
6,427,970 B1 * 8/2002 Silva ..................... 251/129.01

FOREIGN PATENT DOCUMENTS

| JP | 6-249133 | 9/1994 |
| JP | 7-55021 | 3/1995 |

* cited by examiner

Primary Examiner—J. Casimer Jacyna
(74) Attorney, Agent, or Firm—Nixon & Vanderhye P.C.

(57) ABSTRACT

In a flow amount control device, column shaped valve element is slidably disposed in a cylindrical inner circumferential wall of a valve body. The valve element is provided along an outer circumference thereof with two ring shaped grooves. Fuel stored in the ring shaped grooves serves to form film of oil for lubrication in a sliding clearance between the valve element and the valve body so that frictional resistance therebetween is smaller and the valve element slides smoothly on the valve body. Accordingly, the device can control flow amount of fuel accurately.

5 Claims, 9 Drawing Sheets

FLOW AMOUNT CONTROL DEVICE

CROSS REFERENCE TO RELATED APPLICATION

This application is based upon and claims the benefit of priority of Japanese Patent Applications No. 2001-344296 filed on Nov. 9, 2001 and No. 2001-348972 filed on Nov. 14, 2001, the contents of which are incorporated herein by reference.

BACKGROUND OF THE INVENTION

1. Field of the Invention

The present invention relates to a flow amount control device.

2. Description of the Prior Art

Conventionally, a common rail fuel injection system is known typically as a system for supplying fuel to a diesel engine (hereinafter called an engine). The common rail fuel injection system is provided with an accumulation chamber (common rail) commonly communicating with each of cylinders of the engine. A fuel injection pump, whose fuel discharge amount is variable in each stroke, supplies high pressure fuel by necessary amount to the common rail so that pressure of fuel accumulated in the common rail is kept constant.

To keep pressure of the fuel accumulated in the common rail constant, flow amount of fuel to be supplied to the fuel injection pump is adjusted according to conditions of engine load so that flow amount of fuel discharged from the fuel injection pump is controlled. In the conventional common rail fuel injection system, a flow amount control device is provided between the fuel injection pump and a low pressure pump for feeding fuel to the fuel injection pump so that the flow amount of fuel supplied to the fuel injection pump and the flow amount of fuel discharged from the fuel injection pump are controlled.

In the flow amount control device incorporated in a pump device, a column shaped valve element is slidably moved within a cylindrical valve body by electromagnetic force of a drive member. Movement of the valve element in the valve body causes to change a relative position between adjusting ports or grooves formed in the valve element and communication bores formed in the valve body. The flow amount of fuel to be supplied to the fuel injection pump is adjusted by changing opening areas of the communication bores actually opened to the adjusting ports or grooves.

In the flow amount control device, each shape of the communication bores or each shape of the adjusting ports or grooves has to be determined in consideration of operation characteristic of an electromagnetic drive member under conditions that, according to changes of current applied to the drive member, the flow amount of fuel discharged from the flow amount control device, that is, flow amount characteristic, has to be accurately changed with a given non-linear relationship. Accordingly, it is costly to form the valve element having such adjusting ports or grooves or the valve body having such communication bores.

Further, generally, the moving amount of the valve element corresponds to an opening degree of acceleration valve for driving an engine. When a change of the opening degree of the acceleration valve is relatively small, for example, at a constant speed cruising time, the moving amount and speed of the valve element is relatively small. In addition, when the engine is not operated for a long time, the valve element does not move and rests in place for a long time. In these cases, a sliding clearance between the valve element and the valve body is not sufficiently filled with film of oil (fuel) for lubrication. In particular, in use of fuel whose viscosity is lower and which has poorer lubrication characteristic, adequate formation of the film of oil for lubrication is rather difficult, which causes higher frictional resistance at sliding surfaces between the valve element and the valve body so that the accurate flow amount control of the device can not be achieved.

Furthermore, since the flow amount control device is installed on an inlet side of the fuel injection pump so that pressure of oil flowed into the flow amount control device is relatively low, the fuel is not forced to flow into the sliding clearance between the valve element and the valve body.

In a case that an axial length of a cylindrical outer circumference of the valve element that slides on a cylindrical inner surface of the valve body is relatively long, an axial middle part of the outer circumference of the valve element is not sufficiently filled with fuel for lubrication.

SUMMARY OF THE INVENTION

An object of the present invention is to provide a flow amount control device with less deviations of flow amount characteristic and at lower manufacturing cost.

It is an aspect of the present invention to provide the flow amount control device in which a valve element smoothly moves slidably in a valve body with less frictional resistance therebetween.

Another aspect of the present invention is to provide the flow amount control device having the valve element and valve body, whose constructions are simpler.

To achieve the above object, in a device for controlling flow amount of fluid flowing between first and second fluid passages, a valve body has a cylindrical inner circumferential wall within which the first fluid passage is formed, an outer circumferential wall outside which the second fluid passage is formed and at least a communication bore which penetrates from the inner circumferential wall to the outer circumferential wall. An inner opening of the communication bore on a side of the inner circumferential wall comes in communication with the first fluid passage and an outer opening of the communication bore on a side of the outer circumferential wall communicates with the second fluid passage. A column shaped valve element is slidably disposed inside the inner circumferential wall. A drive member causes the valve element to move reciprocatingly in an axial direction of the valve body so that an area of the inner opening opened to the first fluid passage is variable according to changes of position of the valve element relative to the valve body.

With the device mentioned above, at least one of the valve element and the valve body is provided within sliding surfaces between the valve element and the valve body with at least a ring shaped groove extending circumferentially.

Since fuel is stored in the ring shaped groove, the fuel serves to form film of oil for lubrication in a sliding clearance between the valve element and the valve body so that frictional resistance therebetween is smaller. Accordingly, the device can control flow amount of fuel accurately.

The ring shaped groove may be formed only on an outer circumference of the valve element, only on the inner circumferential wall of the valve body or both on the outer circumference of the valve element and on the inner circumferential wall of the valve body.

Further, the ring shaped groove may be a plurality of grooves axially spaced. The number of the grooves and axial intervals between the grooves can be determined adequately according to an axial length of the column shaped valve element or stroke of the valve element.

As an alternative, the valve element may be provided at an axial end thereof with a spherical surface whose outer circumference perpendicular to the inner circumferential wall is in annular line contact with the inner circumferential wall.

With this construction, fuel flowing to the communication bore from the first fluid passage is guided by the spherical surface of the valve element so that fuel smoothly flows from the first fluid passage to the communication bore without substantial turbulent flow. Accordingly, the manufacturing cost of the valve element is lower.

It is preferable that the valve element is a round ball. In this case, only the valve element is in annular line contact with the inner circumferential wall of the valve body so that frictional resistance between the valve element and the valve body is smaller. Accordingly, it is not necessary to form the ring shaped grooves for forming the film of oil for lubrication.

As another alternative, the valve element may be composed of a column shaped body and a hemispherical body which are integrated into one piece and outer circumference of the column shaped body, whose diameter is equal to that of the outer circumference of the spherical surface in annular line contact with the inner circumference, is in surface contact with the inner circumferential wall.

To reduce frictional resistance between the outer circumference of the column shaped body and the inner circumferential wall of the valve body, the column shaped body may be provided midway between opposite axial ends thereof with at least a ring shaped groove formed along the outer circumference thereof and/or the valve body may be provided within the inner circumferential wall on which the column shaped body slides with at least a ring shaped groove formed along the inner circumference thereof.

BRIEF DESCRIPTION OF THE DRAWINGS

Other features and advantages of the present invention will be appreciated, as well as methods of operation and the function of the related parts, from a study of the following detailed description, the appended claims, and the drawings, all of which form a part of this application. In the drawings:

DESCRIPTION OF THE PREFERRED EMBODIMENTS

Preferred embodiments of the present invention are described with reference to drawings.

(First Embodiment)

Figure 1:
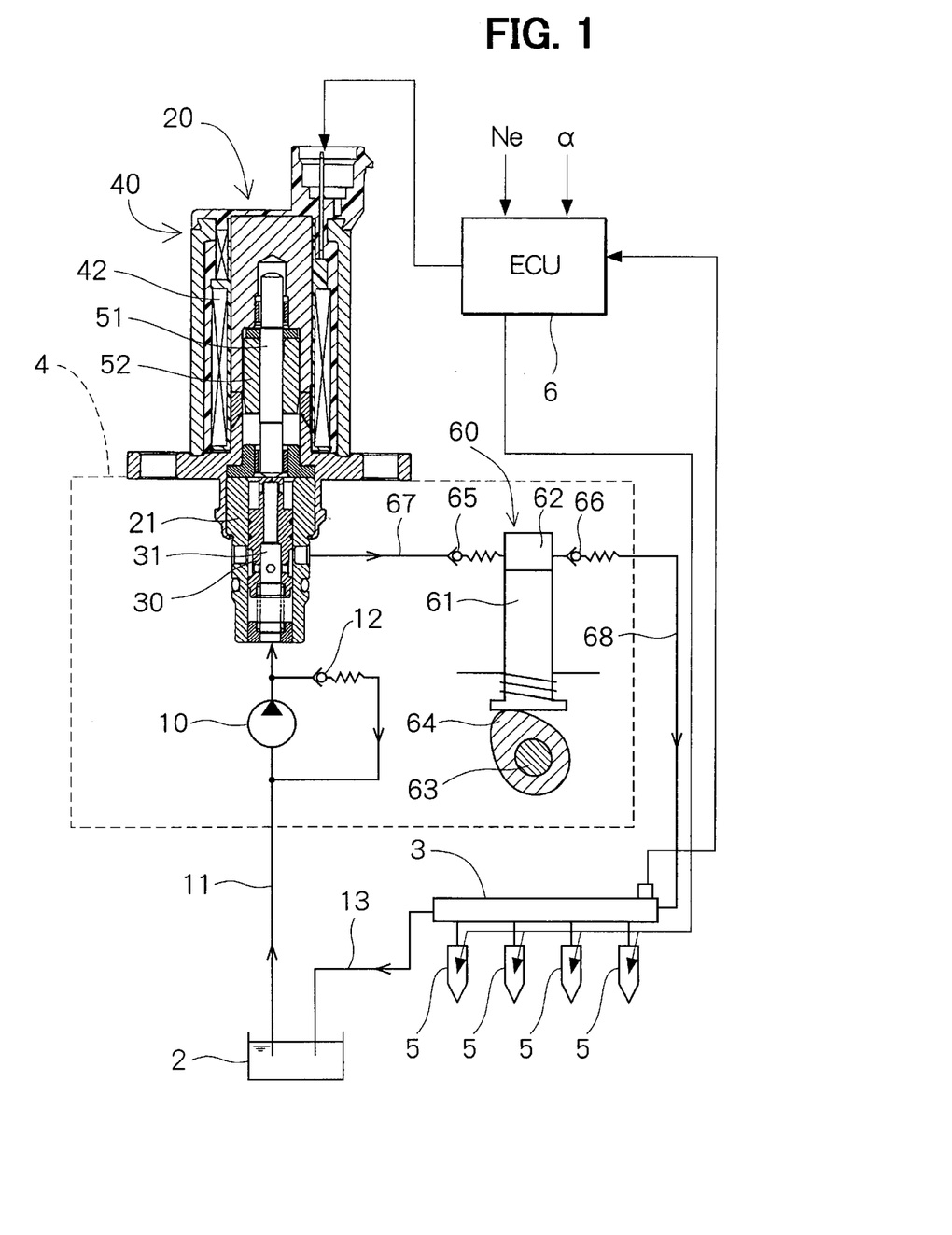
FIG. 1 is a schematic cross sectional view of a common rail type fuel injection system incorporating a flow amount control device according to a first embodiment of the present invention.

FIG. 1 shows a common rail type fuel injection system incorporating a flow amount control device according to a first embodiment of the present invention.

The common rail type fuel injection system 1 is composed mainly of a fuel tank 2, a low pressure pump 10, a flow amount control device 20, a fuel injection pump 60 and a common rail 3. The low pressure pump 10, the flow amount control device and the fuel injection pump 60, which are surrounded by a dotted line in FIG. 2, constitute an integrated fuel injection pump unit 4.

The fuel tank 2 stores fuel under normal pressure. The fuel stored in the fuel tank 2 is supplied via a fuel passage 11 to the flow amount control device 20 by the low pressure pump 10. When pressure of fuel supplied by the low pressure pump exceeds a predetermined value, a check valve 12 positioned downstream the low pressure pump 10 serves to return the fuel to the fuel tank 2.

The fuel injection pump 60 has a plunger 61 whose reciprocal movement causes to pressurize fuel in a pressure chamber 62. In the fuel injection pump 60, flow amount of fuel discharged is variable according to flow amount of fuel flowed into the pressure chamber 62. The plunger 61 is driven to move upward and downward in FIG. 1 by a cam 64 mounted on a crankshaft 63 of an engine (not shown) and rotated together with the crankshaft 63. Fuel is supplied to the pressure chamber 62 via the flow amount control device 20, a fuel supply passage 67 and a check valve 65 when the plunger 61 moves downward and discharged under pressure from the pressure chamber 62 via a check valve 66 and a fuel discharge passage 68 to the common rail 3 when the plunger moves upward.

The common rail 3 accumulates fuel pressurized by the fuel injection pump 60. Injectors 5, whose number is equal to that of cylinders of the engine, are connected to the common rail 3 for injecting fuel accumulated in the common rail 3 to the respective cylinders. The common rail 3 is provided with a fuel return passage 13 through which surplus fuel in the common rail 3 is returned to the fuel tank 2.

The fuel injection system 1 is connected in circuit with ECU 6. ECU 6 controls current to be applied to the flow amount control device in order to secure optimum flow amount of fuel to be discharged from the fuel injection pump 60 according to input signals of engine operating conditions such as fuel pressure in the common rail 3, an engine revolution number Ne, a throttle valve (acceleration) opening degree α, and the like. Further, ECU 6 controls each opening and closing timing of electromagnetic valves (not shown) of the injectors 5 connected to the common rail 3 so that injection timing and amount of fuel applicable to the respective cylinders are adjusted.

Figure 3:
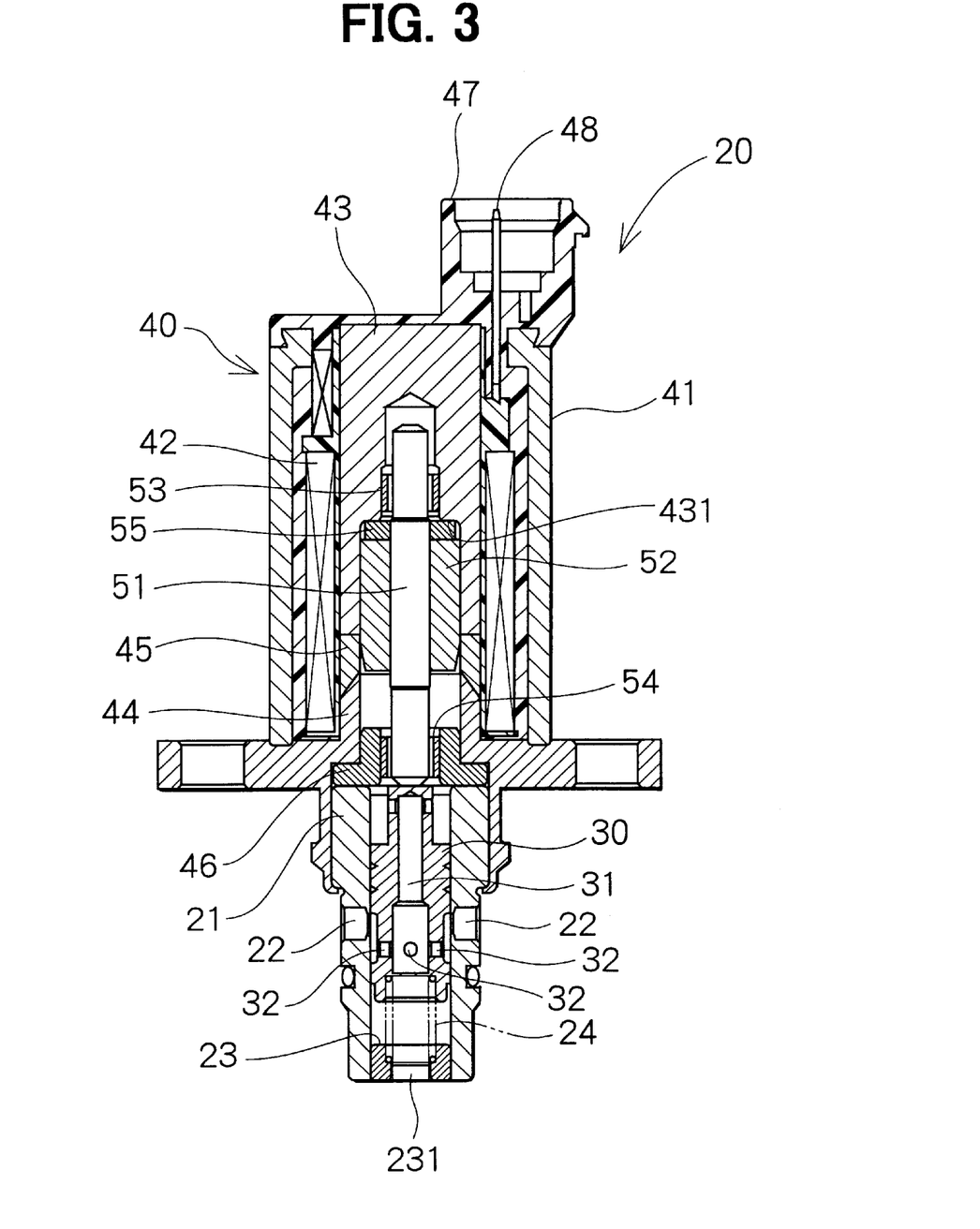
FIG. 3 is a schematic cross sectional entire view of the flow amount control device of FIG. 1.

As shown in FIG. 3, the flow amount control device 20 is composed of a valve body 21, a valve element 30, a spring 24 and an electromagnetic drive member 40. The spring 24 and the electromagnetic drive member 40 constitute a drive member. The flow amount control device 20 is a normally open type device in which fuel flow is allowed when current supply to the electromagnetic drive member 40 stops.

Figure 2:
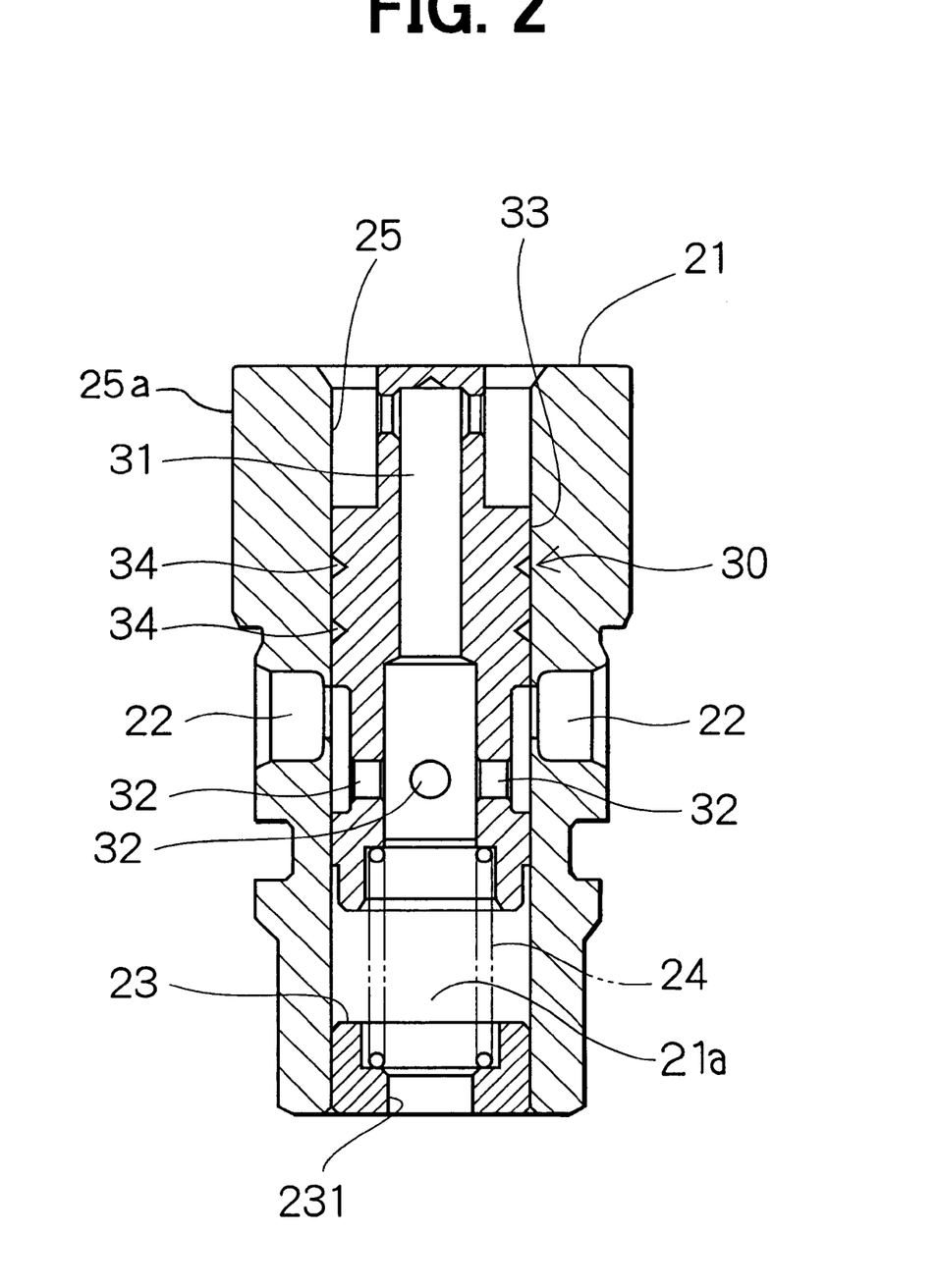
FIG. 2 is a schematic cross sectional part view of the flow amount control device of FIG. 1.

The valve body 21 has an inner circumferential wall 25 formed substantially in cylindrical shape for accommodating the valve element 30 slidably and reciprocatingly movable therein. The valve body 21 is provided at positions circumferentially spaced with communication bores 22 radially penetrating from the inner circumferential wall 25 to an outer circumferential wall 25a. As shown in FIG. 1, each of the communication bores 22 communicates with the fuel supply passage 67 through which fuel is supplied to the fuel injection pump 60. As shown in FIGS. 2 and 3, a bush 23 is press fitted to an axial end of the inner circumferential wall 25 of the valve body 21 on a side of the low pressure pump 21, that is, on a side opposite to the electromagnetic drive member 40. The bush 23 is provided in a center thereof with a communication hole 231 communicating with a fuel passage 11.

The valve element 30 is formed substantially in shape of a column having an outer circumferential wall 33. The valve element 30 is provided in a center thereof with a fuel passage 31 through which opposite axial ends thereof substantially communicates with each other and on the outer circumferential wall 33 at positions radially spaced with a plurality of adjusting ports 32 each communicating with the fuel passage 31. The communication hole 231 of the bush 23, an inner space 21a of the inner circumferential wall 25 of the valve body 21 between the valve element 30 and the bush 23, the fuel passage 31 and the adjusting ports 32 constitute a fluid passage. The communication between the adjusting ports 32 (the fluid passage) and the communication bores 22 is allowed or interrupted by moving the valve element 30 upwardly or downwardly in FIGS. 2 and 3. That is, an area of each communication bore 22 opened to each adjusting port 32 changes according to change of the relative position between the valve element 30 and the valve body 21 so that flow amount of fuel flowing from the fuel passage 11 through the fluid passage and the communication bores 22 to the fuel supply passage 67 may be adjusted.

An end of the spring 24 is in contact with the axial end of the valve element 30 on a side of the bush 23 and the other end thereof is in contact with the bush 23. The spring 24 urges the valve element 30 toward the electromagnetic drive member 40.

The outer circumferential wall 33, which slides on the inner circumferential 25, is provided circumferentially with a plurality of ring shaped grooves 34 (two grooves in this embodiment) axially spaced. Each cross section of the ring shaped grooves 34 is formed in a letter V. A number of the ring shaped grooves 34 and axial intervals therebetween can be determined adequately according to axial length of the outer circumferential wall 33 and stroke of the valve element 30.

Each of the ring shaped grooves 34 stores fuel, which flows into the clearance between the valve element 30 and the valve body 21 when the valve element 30 moves axially. Even if the axial length of the outer circumferential wall 33 of the valve element 30 to be driven by the electromagnetic drive member 40 is relatively long, the clearance between the valve element 30 and the valve body 21 is filed sufficiently with the film of oil (lubrication) so that frictional resistance of the sliding contact between the valve element 30 and the valve body 21 is relatively low.

As shown in FIG. 3, the electromagnetic drive member 40 has a solenoid portion and a movable member. The solenoid portion is composed of a yoke 41, a coil 42, a first stator 43, a second stator 44, a guide 45 and a stator cover 46. The yoke 41 is formed in cylindrical shape and made of magnetic material. The coil 42 is arranged along an inner circumference of the yoke 41 and connected with a terminal 48 of a connector 47. The first and second stators 43 and 44 are made of magnetic material and connected, for example, by welding with the guide 45, which is made of non-magnetic material. An integrated body of the first and second stators 43 and 44 and the guide 45 is fitted to an inner circumference of the coil 42. The stator cover 46 is press fitted to an inner circumference of the second stator 44.

The valve body 21 is inserted into the inner circumference of the second stator 44 and, then, an axial end of the second stator 44 is crimped or staked against the valve body 21 so that the valve body 21 and the second stator 44 are integrated into one body.

The movable member is composed of an armature 52 made of magnetic material and a shaft 51 press fitted into the armature 52. The movable member is slidably arranged inside the first and second stators 43 and 44 and the guide 45. Opposite axial ends of the movable member is supported by linear bearings 53 and 54, respectively. A washer 55 is disposed between a step portion 431 of the first stator 43 and an axial end of the armature 52 on a side opposite to the valve element 30. The washer 55 is made of non-magnetic material and prevents the armature 52 from being attracted toward the first stator 43.

When the coil 42 is energized, magnetic field generated from the coil 42 forms a magnetic circuit constituted by the first stator 43, the armature 52, the second stator 44 and the yoke 41. Accordingly, the shaft 51 and the armature 52 are attracted toward the second stator 44. An axial end of the armature 52 on a side of the stator cover 46 is tapered and length of a gap between the armature 52 and the second stator 44 is variable according to a value of magnetic force acting between the armature 52 and the stator 44. That is, a moving amount of the armature 52 including shaft 51 varies according to a value of current applied to the coil 42.

The axial end of the shaft 51 on a side of the stator cover 46 is in contact with the axial end of the valve element 30 on a side opposite to the bush 23 so that the movements of the armature 52 and the shaft 51 cause to move the valve element 30.

Next, fuel flow of the fuel injection system 1 is described.

As shown in FIG. 1, the low pressure pump 10 supplies fuel from the fuel tank 2 to the flow amount control device 20. The fuel supplied to the flow amount control device 20 through the communication hole 231 of the bush 23 flows to the adjusting ports 32 through the fuel passage 31.

When current is not applied to the coil 42, the valve element 30 is urged toward the electromagnetic drive member 40 by a biasing force of the spring 24 so that the axial end of the valve element 30 on a side of the electromagnetic drive member 40 is in contact with an axial end of the stator cover 46 on a side of the valve element 30 so that the movement of the valve element 30 stops. At this time, as shown in FIG. 2, the adjusting ports 32 of the valve element 30 fully communicate with the communication bores 22 of the valve body 21. Accordingly, the fuel supplied from the fuel passage 11 flows to the fuel supply passage 67 through the communication hole 231, the inner space 21a of the valve body 21, the fuel passage 31, the adjusting ports 32 and the communication bores 22. That is, when the current applied to the coil 42 is zero, the fluid passage is in a fully open state.

When current is applied to the coil 42, the armature 52 is attracted toward the second stator 44 due to the magnetic field generated in the coil 42. Accordingly, the shaft 51 together with the armature 52 moves toward the valve element 30. The shaft 51 pushes downward in FIG. 2 the valve element 30 against the biasing force of the spring 24. The moving amount of the armature 52 (the shaft 51) is proportional to a value of the current applied to the coil 42.

The downward movement of the valve element 30 causes to reduce an area of each communication bore 22 opened to each adjusting port 32, which results in reducing flow amount of fuel to be supplied to the fuel injection pump 60. A value of the area of each communication bore 22 opened to each adjusting port 32 is variable according to a position to which the valve element 30 moves, that is, according to a value of the current applied to the coil 42. Change of the area of each communication bore 22 opened to each adjusting port 32 causes to change the flow amount of fuel flowing from the fuel passage 11 to the fuel supply passage 67 so that the flow amount of fuel supplied to the fuel injection pump 60 is controlled.

The fuel flowed out to the fuel supply passage 67 is applied via the check valve 65 to the pressure chamber 62 of the fuel injection pump 60 where the fuel is pressurized by the plunger 61. When pressure of the pressure chamber 62 reaches a given value, the check valve 66 is opened so that pressurized fuel is discharged to the fuel discharge passage 68 and, then, stored in an accumulated state in the common rail 3. The fuel stored in the common rail 3 is injected from each of the injectors 5 to each engine cylinder at a given timing.

According to the first embodiment mentioned above, the grooves 34 is formed on the outer circumferential wall 33 of the valve element 30 so that the sliding surfaces between the valve body 21 and the valve element 30 are well lubricated due to formation of the film of oil. For example, when the movement of the valve element 30 stops for a long time because of no operation of the engine, or when the movement of the valve element 30 is slight or the moving speed of the valve element 30 is slow at a constant speed cruising time, the sliding surfaces between the valve body 21 and the valve element 30 can be covered with the film of oil so that the valve element 30 is smoothly slidable in the valve body 21, which promotes an accurate regulation of the flow amount of fuel to be applied to the fuel injection pump 60.

(Second Embodiment)

Figure 4:
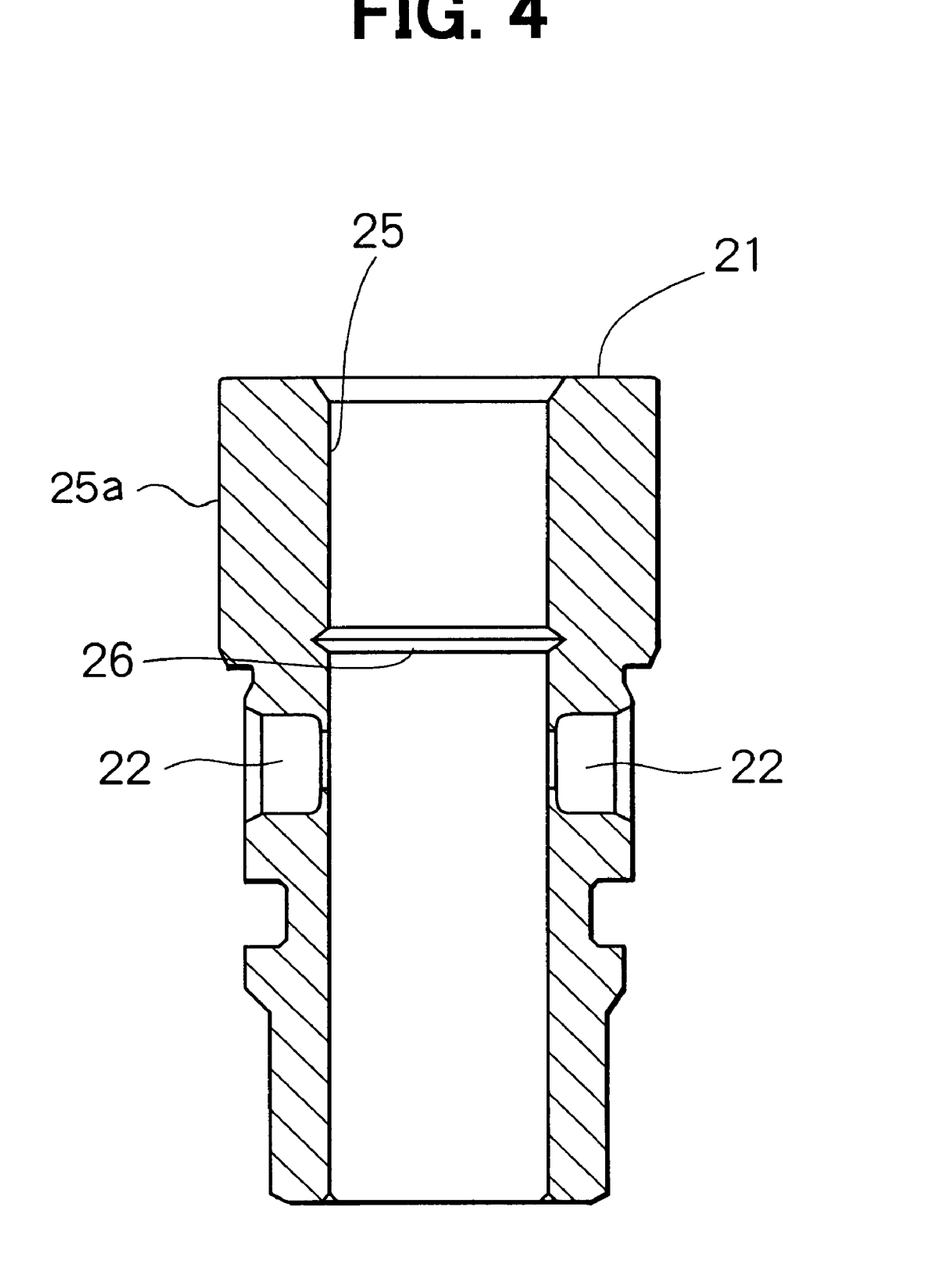
FIG. 4 is a schematic cross sectional part view of a flow amount control device according to a second embodiment.

FIG. 4 shows a valve body 21 of a flow amount control device 20 according to a second embodiment.

The valve body 21 is provided at an inner circumferential wall thereof with ring shaped grooves 26 which are axially spaced. Each cross section of the ring shaped grooves 26 is formed in a letter V. A number of the ring shaped grooves 26 and axial intervals therebetween can be determined adequately according to axial length of the outer circumferential wall 33 of the valve element and stroke of the valve element 30, which is similar as the first embodiment in which the ring shaped grooves 34 are provided in the valve element 30.

Similarly to the first embodiment, the ring shaped grooves 26 promote formation of the film of oil on the sliding surfaces between the valve body 21 and the valve element 30 so that smooth movement of the valve element is secured.

The flow amount control device may have both the ring shaped grooves 34 as described in the first embodiment and the ring shaped grooves 26 as described in the second embodiment. The number of the respective grooves 34 and 26 and axial intervals thereof may be defined adequately.

(Third Embodiment)

Figure 5:
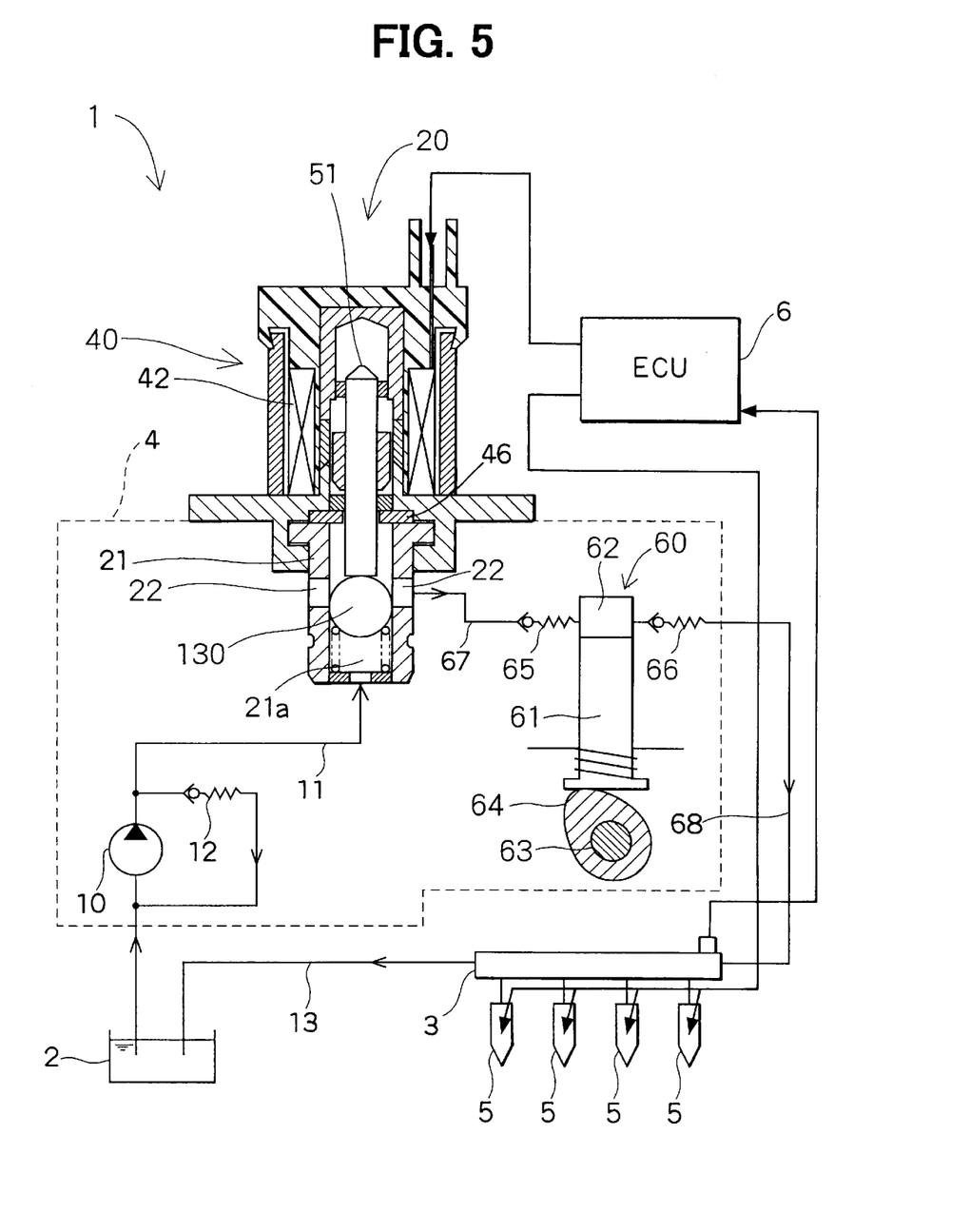
FIG. 5 is a schematic cross sectional view of a common rail type fuel injection system incorporating a flow amount control device according to a third embodiment.

FIG. 5 shows a common rail type fuel injection system incorporating a flow amount control device according to a third embodiment of the present invention.

The common rail type fuel injection system 1 is similar to that of the first embodiment except the flow amount control device 20.

Figure 7:
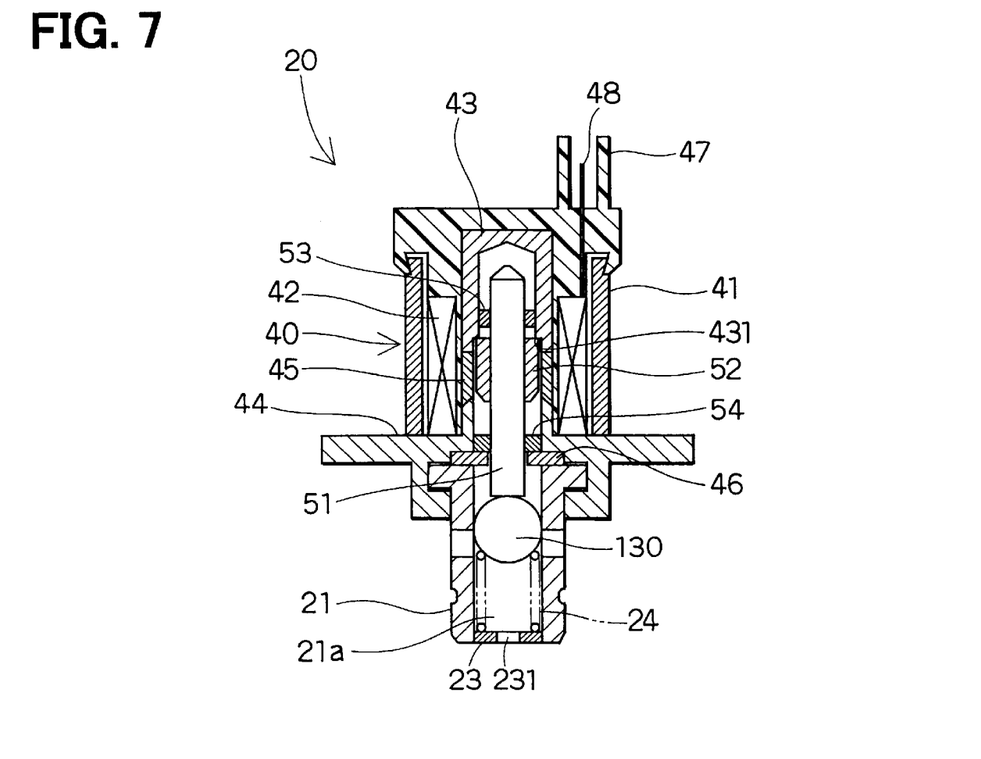
FIG. 7 is a schematic cross sectional entire view of the flow amount control device of FIG. 5.

As shown in FIG. 7, the flow amount control device 20 according to the third embodiment is composed of a valve body 21, a valve element 130, a spring 24 and an electromagnetic drive member 40. The spring 24 and the electromagnetic drive member 40 constitute a drive member.

Figure 6:
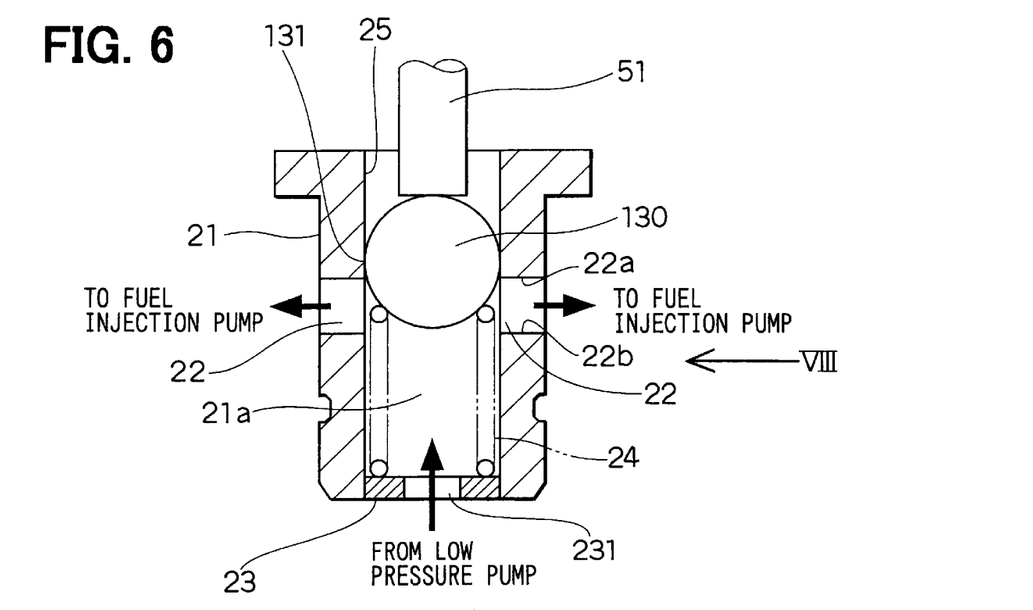
FIG. 6 is a schematic cross sectional part view of the flow amount control device of FIG. 5.

As shown in FIG. 6, the valve body 21 has an inner circumferential wall 25 formed substantially in cylindrical shape for accommodating the valve element 130 slidably and reciprocatingly movable therein. The valve body 21 is provided at positions circumferentially spaced with communication bores 22 radially penetrating from the inner circumferential wall 25 to an outer circumference 25a thereof.

Figure 8:
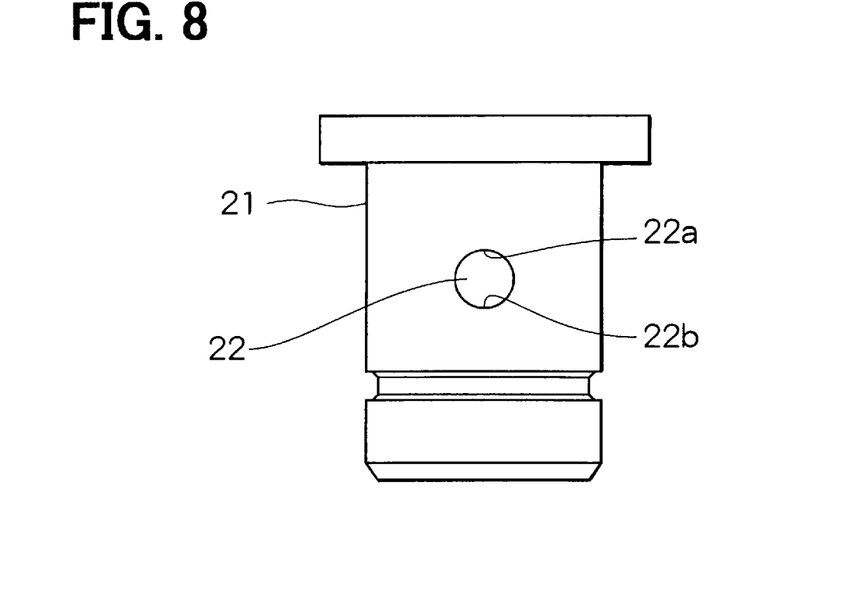
FIG. 8 is a schematic part view as viewed from an arrow VIII of FIG. 6.

As shown in FIG. 5, each of the communication bores 22 communicates with the fuel supply passage 67 through which fuel is supplied to the fuel injection pump 60. As shown in FIGS. 6 and 7, a bush 23 is press fitted to an axial end of the inner circumferential wall 25 of the valve body 21 on a side of the low pressure pump 21, that is, on a side opposite to the electromagnetic drive member 40. The bush 23 is provided in a center thereof with a communication hole 231 communicating with a fuel passage 11. As shown in FIG. 8, each cross section of the communication bores 22 perpendicular to each axis thereof is formed in round shape.

The valve element 130 is a round ball. An outer surface of the valve element 130 is formed in spherical shape. Outer diameter of the valve element 130 is substantially equal to inner diameter of the inner circumferential wall 25 of the valve body 21. The valve element 130 is in slidable contact with the inner circumferential wall 25 of the valve body 21 and movable axially in the valve body 21. An outer circumferential line of the valve element 130 in contact with the inner circumferential wall 25 constitutes a contact line 131.

An end of the spring 24 is in contact with the axial end of the valve element 130 on a side of the bush 23 and the other end thereof is in contact with the bush 23. The spring 24 urges the valve element 130 toward the electromagnetic drive member 40. An inner space 21a of the inner circumferential wall 25 between the valve element 130 and the bush 23 forms a fuel passage.

The electromagnetic drive member 40 according to the third embodiment is similar to that according to the first embodiment.

An axial end of a shaft 51 on a side of a stator cover 46 is in contact with a spherical surface of the valve element 130 on a side opposite to the bush 23 so that movements of an armature 52 along with the shaft 51 cause to move the valve element 130.

Next, fuel flow of the fuel injection system 1 is described.

As shown in FIG. 5, a low pressure pump 10 supplies fuel from a fuel tank 2 to the flow amount control device 20. The fuel supplied to the flow amount control device 20 through the communication hole 231 of the bush 23 flows to the fuel passage 21a.

When current is not applied to a coil 42, the valve element 130 is urged toward the electromagnetic drive member 40 by a biasing force of the spring 24 so that an axial end of the armature 52 on a side of the first stator 43 is in contact with the step portion 431 of the first stator 43 so that the movement of the valve element 130 stops. At this time, as shown in FIGS. 6 and 7, the circular contact line 131 of the valve element 130 is in contact with the inner circumferential wall 25 of the valve body 21 above an highest portion 22a of each of the communication bores 22 so that the fuel passage 21a fully communicates with the communication bores 22 of the valve body 21. Accordingly, the fuel supplied from a fuel passage 11 flows to a fuel supply passage 67 through the communication hole 231, the fuel passage 21a and the communication bores 22. That is, when the current applied to the coil 42 is zero, a fluid passage from the fuel passage 11 to the fuel supply passage 67 is in a fully open state.

When current is applied to the coil 42, the armature 52 is attracted toward the second stator 44 due to the magnetic field generated in the coil 42. Accordingly, the shaft 51 together with the armature 52 moves toward the valve element 130. The shaft 51 pushes downward in FIG. 6 the valve element 130 against the biasing force of the spring 24. The moving amount of the armature 52 (the shaft 51) is proportional to a value of the current applied to the coil 42.

The downward movement of the valve element 130 causes to reduce an area of each communication bore 22 opened to the fuel passage 21a, which results in reducing flow amount of fuel to be supplied to the fuel injection pump 60. A value of the area of each communication bore 22 opened to the fuel passage 21a is variable according to a position to which the valve element 130 moves, that is, according to a value of the current applied to the coil 42. Change of the area of each communication bore 22 opened to the fuel passage 21a causes to change the flow amount of fuel flowing from the fuel passage 11 to the fuel supply passage 67 so that the flow amount of fuel supplied to the fuel injection pump 60 is controlled.

Figure 10:
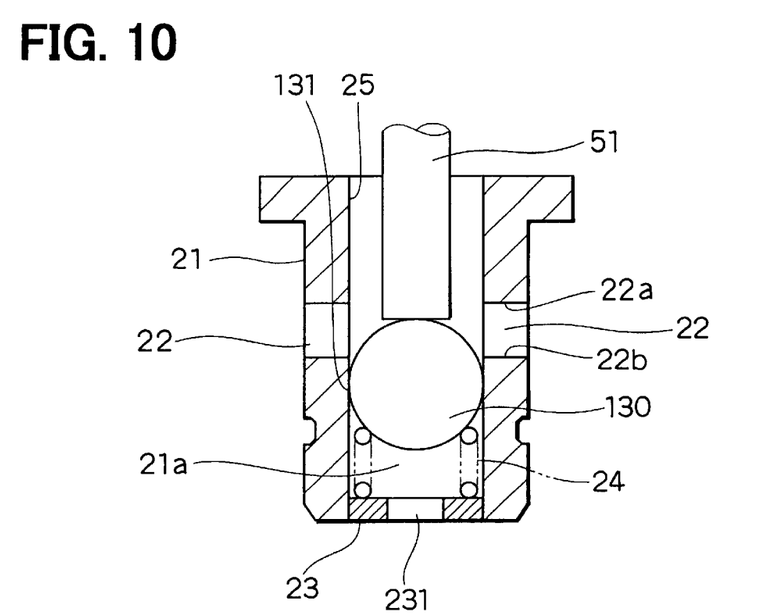
FIG. 10 is another schematic cross sectional part view of the flow amount control device of FIG. 5.

As shown in FIG. 10, when the valve element 130 is further moved downward, the circular contact line 131 of the valve element 130 comes in contact with the inner circumferential wall 25 of the valve body 21 below a lowest portion 22b of each of the communication bores 22 so that fuel flow from the fuel passage 21a to the communication bores 22 is interrupted.

The fuel flowed out to the fuel supply passage 67 is applied via a check valve 65 to a pressure chamber 62 of the fuel injection pump 60 where the fuel is pressurized by the plunger 61. When pressure of the pressure chamber 62 reaches a given value, the check valve 66 is opened so that pressurized fuel is discharged to the fuel discharge passage 68 and, then, stored in an accumulated state in the common rail 3. The fuel stored in the common rail 3 is injected from each of the injectors 5 to each engine cylinder at a given timing.

According to the third embodiment, since the valve element 130 is the round ball, fuel flowing to the communication bores 22 from the fuel passage 21a is guided by the spherical surface of the valve element 130 so that fuel smoothly flows from the fuel passage 21a to the communication bores 22 without substantial turbulent flow, even if the adjusting ports 32 are not provided inside the valve element 30 as in the first embodiment. Accordingly, the manufacturing cost of the valve element 130 is lower.

Further, only the circular contact line 131 of the valve element 130 slides on the inner circumferential wall 25 of the valve body 21 so that frictional resistance between the valve element 130 and the valve body 21 is smaller. Accordingly, it is not necessary to form the ring shaped grooves 34 for forming the film of oil for lubrication, as described in the first embodiment.

Figure 9:
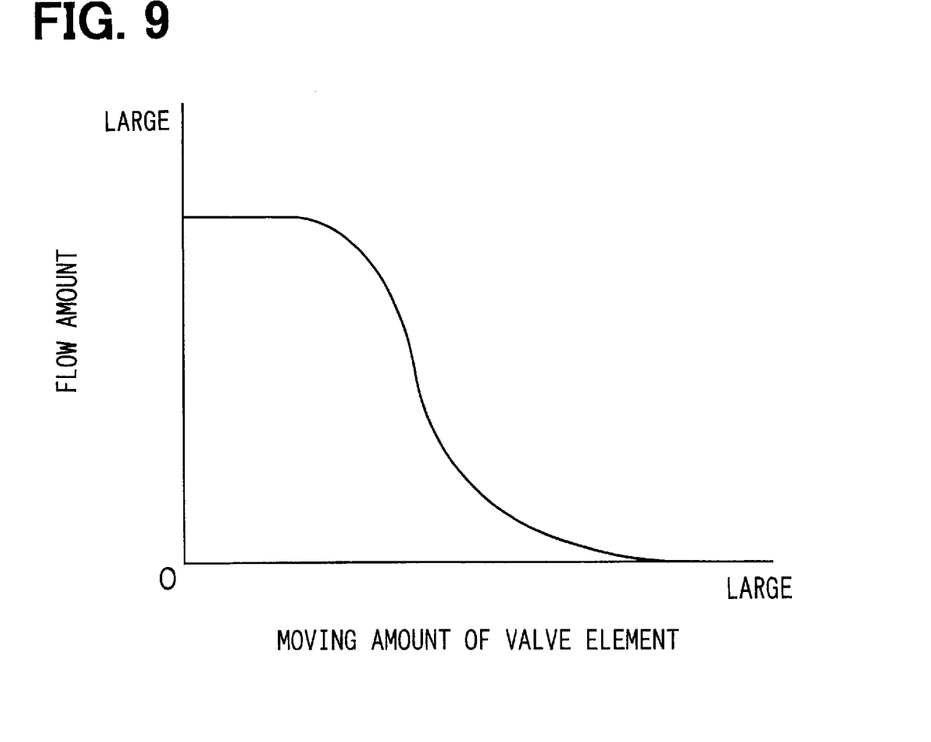
FIG. 9 is a chart showing a relationship between flow amount of fuel and moving amount of the valve element of the flow amount control device of FIG. 5.

Furthermore, even if each shape of the communication bores 22 is round as clearly shown in FIG. 8, the flow amount of fuel flowing out from the flow amount control device shows a non-linear characteristic with respect to the axial movement of the valve element 130, as shown in FIG. 9. The round communication bores 22 can be easily manufactured, compared with the conventional communication bores each of which has complicated shape.

(Fourth Embodiment)

Figure 11:
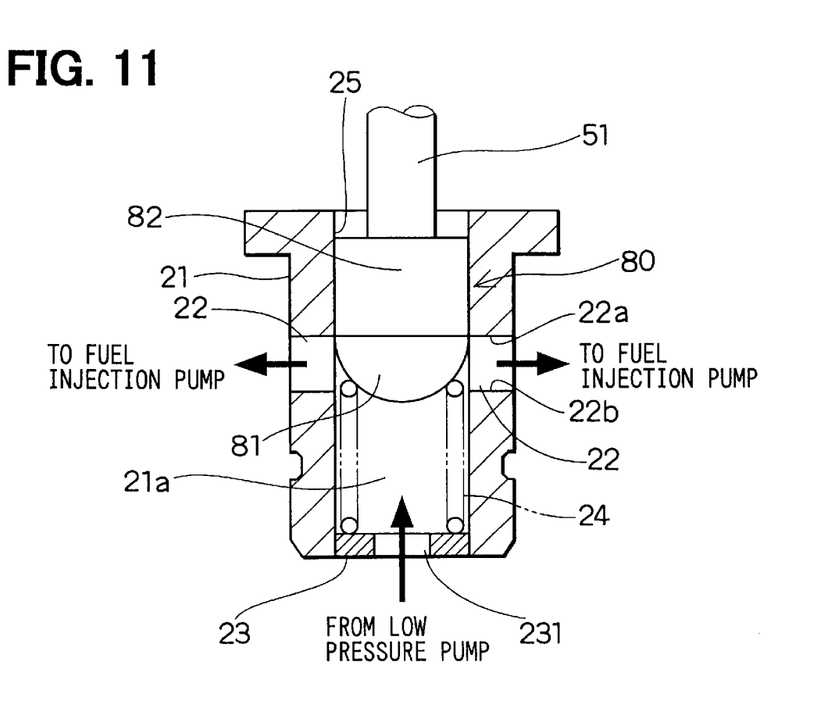
FIG. 11 is a schematic cross sectional part view of the flow amount control device according to a fourth embodiment.

FIG. 11 shows a part of a flow amount control device 20 according to a fourth embodiment.

Shape of a valve element 80 of the flow amount control device 20 according to the fourth embodiment is different from the valve element 30 or 131 according to the first or third embodiment.

The valve element 80 is composed of a spherical portion 81 and a column portion 82 which are integrated into one body. The spherical portion 81 is formed in shape of a hemisphere whose outer diameter is substantially equal to an inner diameter of an inner circumferential wall 25 of a valve body 21. Outer diameter of the column portion 82 is also substantially equal to the inner diameter of an inner circumferential wall 25 of a valve body 21. The column portion 82 moves slidably and reciprocatingly in the inner circumferential wall 25 of the valve body 21.

The valve element 80 according to the fourth embodiment serves to guide smoothly fuel from a fuel passage 21a to communication bores 22 because of the spherical portion 81 formed at an axial end thereof.

Further, when the column portion 82 comes in contact with the inner circumferential wall 25 of the valve body 21 below a lowest portion 22b of each of the communication bores 22, fuel flow from the fuel passage 21a to the communication bores 22 can be more confidently interrupted, compared with the third embodiment.

(Fifth Embodiment)

Figure 12:
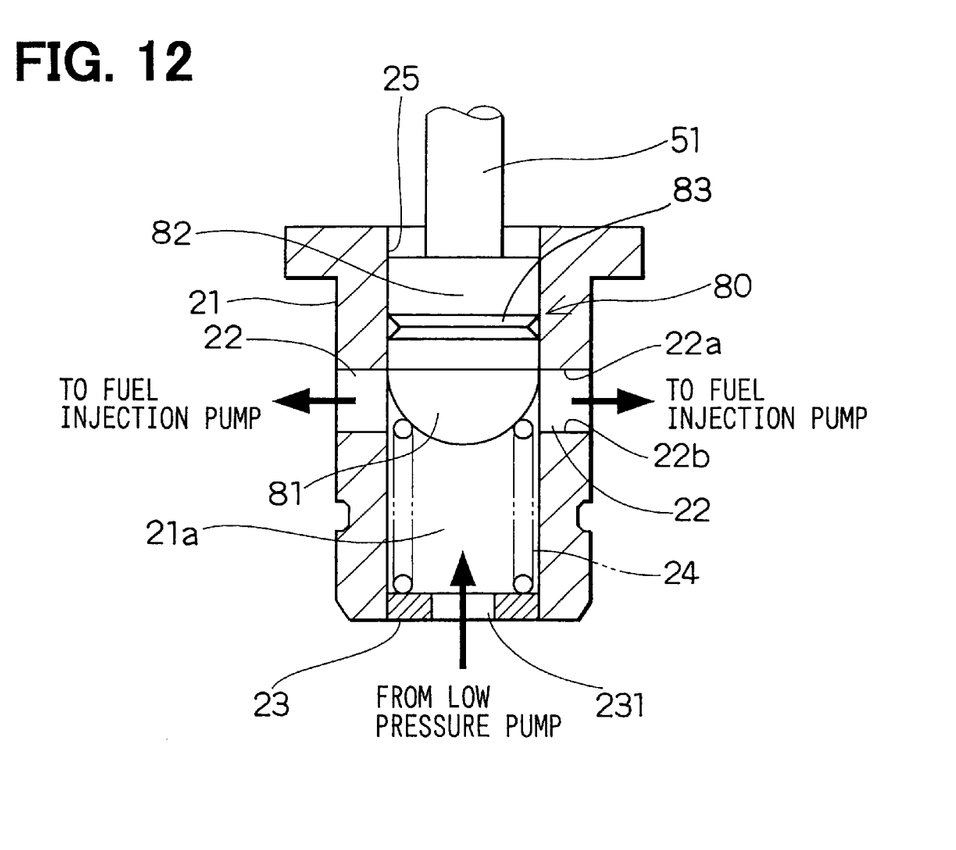
FIG. 12 is a schematic cross sectional part view of the flow amount control device according to a fifth embodiment.

FIG. 12 shows a part of a flow amount control device 20 according to a fifth embodiment.

A valve element 80 of the flow amount control device 20 according to the fifth embodiment has a ring shaped groove 83 formed along outer circumference of the column portion 82 of the valve element 80 as described in the fourth embodiment.

The ring shaped groove 83 serves to lubricate sliding surfaces between the column portion 82 and the inner circumferential wall 25, as described in the first embodiment. The ring shaped groove 83 may be formed on the inner circumferential wall 25 instead of or in addition to the column portion 82. The ring shaped groove 83 may be a plurality of grooves.

In the embodiments mentioned above, the flow amount control device 20 may be of a normally closed type in which communication between the fuel passage 11 and the fuel supply passage 67 is completely interrupted when current is not applied to the coil 42.

What is claimed is:

1. A device for controlling flow amount of fluid flowing between first and second fluid passages comprising:

a valve body having a cylindrical inner circumferential wall within which the first fluid passage is formed, an outer circumferential wall outside of which the second fluid passage is formed and a communication bore which penetrates from the inner circumferential wall to the outer circumferential wall, an inner opening of the communication bore on a side of the inner circumferential wall coming in communication with the first fluid passage and an outer opening of the communication bore on a side of the outer circumferential wall communicating with the second fluid passage;

a column shaped valve element slidably disposed inside the inner circumferential wall; and a drive member causing the valve element to move reciprocatingly in an axial direction of the valve body so that an area of the inner opening opened to the first fluid passage is variable according to changes of position of the valve element relative to the valve body, wherein at least one of the valve element and the valve body is provided within sliding surfaces between the valve element and the valve body with at least a ring shaped groove extending circumferentially.

2. A device according to claim 1, wherein the ring shaped groove is formed on an outer circumference of the valve element.

3. A device according to claim 1, wherein the ring shaped groove is formed on the inner circumferential wall of the valve body.

4. A device according to claim 1, wherein the ring shaped groove is formed both on an outer circumference of the valve element and on the inner circumferential wall of the valve body.

5. A device according to claim 1, wherein the ring shaped groove is a plurality of grooves axially spaced.

* * * * *